United States Patent [19]
Beck et al.

[11] Patent Number: 5,189,324
[45] Date of Patent: Feb. 23, 1993

[54] ELECTROMAGNET MOUNT FOR AN ELECTRIC BRAKE

[75] Inventors: Earl A. Beck, Tulsa; Ken E. Kalies, Seminole, both of Okla.

[73] Assignee: Hayes Axle, Inc., Seminole, Okla.

[21] Appl. No.: 745,543

[22] Filed: Aug. 15, 1991

[51] Int. Cl.$^5$ .................. H02K 5/24; H02K 7/10; G05G 1/00
[52] U.S. Cl. ........................... 310/51; 310/77; 74/470; 188/161
[58] Field of Search ......... 74/470; 188/106 A, 106 P, 188/158, 161, 326; 192/18 A, 30 V, 35, 84 T; 248/635; 310/51, 77; 335/247, 248

[56] References Cited
U.S. PATENT DOCUMENTS

| | | | |
|---|---|---|---|
| 3,244,259 | 4/1966 | Brede, III et al. | 188/138 |
| 3,350,957 | 11/1967 | Morse | 74/470 |
| 3,501,724 | 3/1970 | Westphal | 335/248 |
| 4,014,412 | 3/1977 | Swanson et al. | 188/161 |
| 4,135,607 | 1/1979 | Brown et al. | 188/161 |
| 4,447,749 | 5/1984 | Reeb, Jr. et al. | 310/50 |
| 4,448,294 | 5/1984 | Brandenstein et al. | 192/30 V |
| 4,766,986 | 8/1988 | Dayen et al. | 192/18 A |

OTHER PUBLICATIONS

"Trailer Owner's Manual", by Lambert Eliel, Pub. by Trail-R-Club of America, Box 1376, Beverly Hills, Calif. 90213, 1969.

"Recreational Vehicle Maintenance", by Tim Lockwood, Pub. by Clymer Publications, 222 N. Virgil Ave., Los Angeles, Calif. 90004, 1973.

"Chilton's Travel Trailer Repair & Maintenance Guide", Pub. by Chilton Book Company, 401 Walnut St., Philadelphia, Pa. 19106, 1973.

Primary Examiner—Steven L. Stephan
Assistant Examiner—C. LaBalle
Attorney, Agent, or Firm—Renner, Kenner, Greive, Bobak, Taylor & Weber

[57] ABSTRACT

The present invention provides an improved electric drum brake (10). The electric drum brake (10) utilizes vibration absorbing mount (27) for positioning an electro-magnet (24) on the tang (22) of an actuating lever (21). The vibration absorbing mount (27) prevents metal-to-metal contact between the tang (22) and the electromagnet (24) and eliminates or greatly reduces road vibrations.

7 Claims, 2 Drawing Sheets

ELECTROMAGNET MOUNT FOR AN ELECTRIC BRAKE

TECHNICAL FIELD

This invention relates to an improved electric brake. More particularly, this invention relates to an improved manner in which to mount an electromagnet in electric drum brakes. Specifically, this invention relates to an electric drum brake having a vibration absorber mounted within the electromagnet.

BACKGROUND ART

The majority of states require brakes on all but the smallest of trailers. To meet this requirement electric brakes, operated by the twelve volt electrical system of the tow vehicle, have been used on trailers for several years. The electric brake system of the trailer is integrally connected with the brake and electrical systems of the tow vehicle by a controller which transforms pressure from the master cylinder of the tow vehicle or deceleration of the tow vehicle into electrical current. In general, once hydraulic pressure within the brake system of the tow vehicle or deceleration reaches a selected level, electric current is allowed to flow to the electric brakes of the trailer, thereby effecting braking.

As electric drum brakes rely on an electromagnet to convert the electrical energy supplied by the controller to mechanical energy, the safety and reliability of the brakes depend on the effectiveness of the electromagnet. Typically, the electromagnet will be mounted on an outwardly projecting tang of an actuating lever within the electric drum brake. In this normal mounting method, the magnet experiences metal to metal contact with the tang. Thus under normal operating conditions, road vibrations subject the electromagnets to severe stress. After several miles, the magnet and supporting tang suffer extreme wear which in some cases can result in total failure of the brake unit.

DISCLOSURE OF THE INVENTION

It is thus a primary object of the present invention to provide an improved electric drum brake.

It is another object of the present invention to provide an improved electric drum brake, as above, having a vibration absorbing mount for the electromagnet.

It is yet another object of the present invention to provide an improved electric drum brake, as above, which includes a vibration absorber located within the electromagnet, thereby isolating the electromagnet from vibrations.

These and other objects of the present invention, as well as the advantages thereof over existing prior art forms, which will become apparent from the description to follow, are accomplished by means hereinafter described and claimed.

In general, the improved electric drum brake of the present invention includes an electromagnet carried or otherwise positioned by the tang of a conventional actuating lever. A vibration absorber is located within the electromagnet and thereby isolates the electromagnet from vibrations.

A preferred exemplary electromagnet mount for an electric brake incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
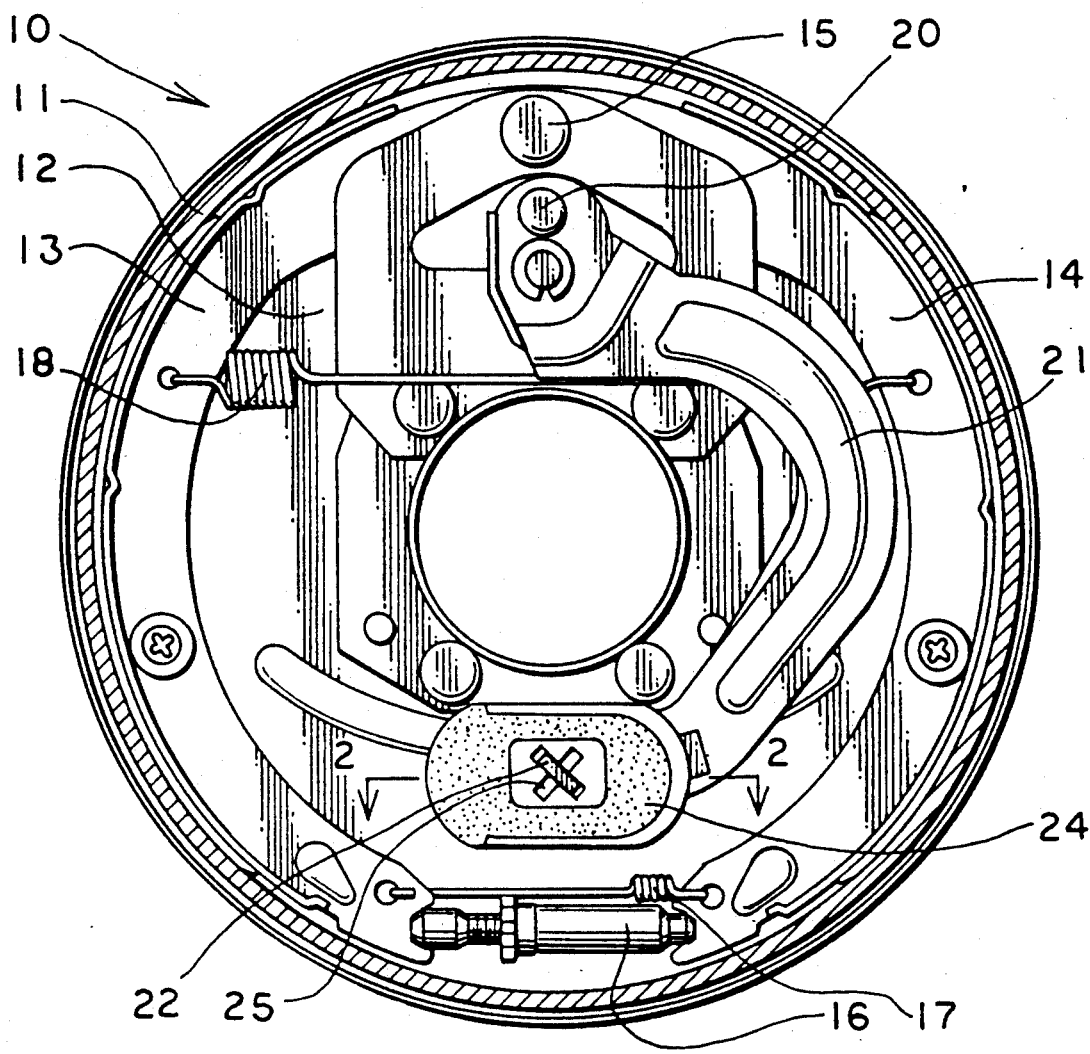
FIG. 1 is a somewhat schematic elevational view of an electric drum brake incorporating the concepts of the present invention.

An improved electric drum brake according to the concepts of the present invention is shown in FIG. 1 and generally indicated by the numeral 10. In order to more clearly show the internal components of brake 10, the conventional brake drum 11 is shown in section only.

Brake 10 includes a backing plate 12 which supports a pair of brake shoes 13 and 14. The upper portions of brake shoes 13 and 14 engage a post 15 and the lower portions are positioned by an adjusting link 16. Tension springs 17 and 18 maintain the relative position of shoes 13 and 14 to post 15, to adjusting link 16, and to each other.

Figure 2:
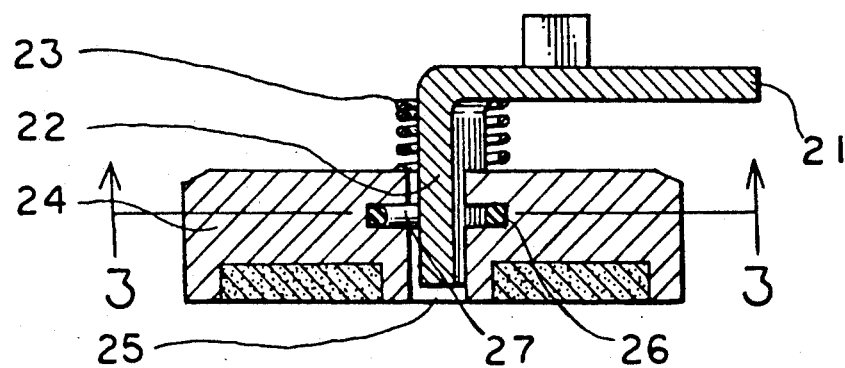
FIG. 2 is a sectional view taken substantially along line 2—2 of FIG. 1 and showing the vibration absorber.
Figure 3:
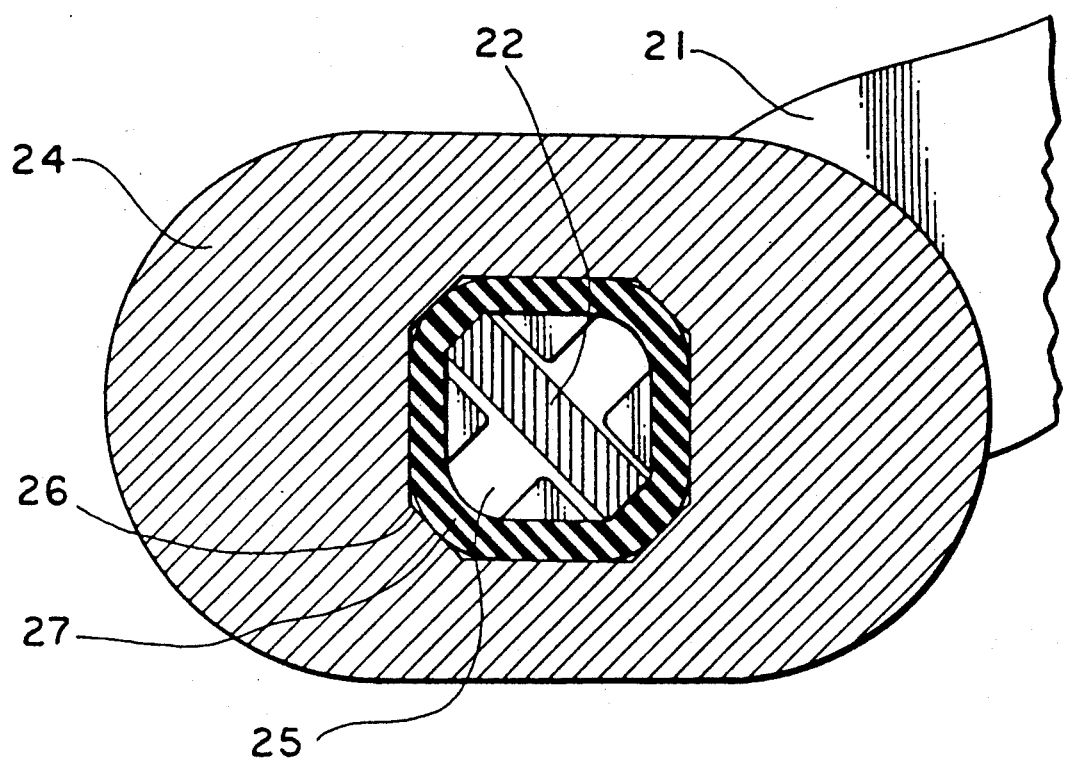
FIG. 3 is an enlarged sectional view taken substantially along line 3—3 of FIG. 2.

A pivot pin 20 attached to backing plate 12 supports an actuating lever 21. The lower end of actuating lever 21 is formed as an outwardly extending tang 22 (FIG. 2) which supports a magnet spring 23 and an electromagnet 24. Electromagnet 24 has a through aperture 25 which may be provided with a circumferential recess 26 in the walls thereof within which is at least partially positioned a vibration absorber 27. As best shown in FIG. 3 vibration absorber 27, being positioned around tang 22, isolates lever 21 from electromagnet 24 and thereby isolates the electromagnet 24 from road vibrations, yet allows the free movement of the electromagnet with respect to tang 22. Thus, vibration absorber 27 prevents the premature failure of electromagnet 24, thereby reducing maintenance costs and providing a safer, more reliable electric drum brake 10. Vibration absorber 27 may take many forms, including but not limited to cork or rubber O-rings, bushings, or the like.

Electric drum brake 10 otherwise operates in a manner identical to any other electric drum brake. Briefly described, when the brakes of the tow vehicle are applied, an electric current is sent to the electromagnet 24 of the electric drum brake 10. The electric current energizes electromagnet 24. The energized electromagnet 24 is attracted to brake drum 11 or alternatively, an armature (not shown) carried by the drum. As electromagnet 24 attempts to rotate with brake drum 11, actuating lever 21 will deflect resulting in the engagement of brake drum 11 by brake shoes 13 and 14 in a manner typical to all standard drum brakes. However, the deleterious effects of metal to metal contact between tang 22 and electromagnet 24 are either eliminated, or greatly reduced, due to the cushioning effect of vibration absorber 27 within electromagnet 24. Thus, the vibration absorber greatly extends the service life of the electromagnet and improves the safety of the electric drum brake.

It should thus be evident that an electric drum brake constructed according to the concept of the present invention, as described herein, substantially improves the art and otherwise accomplishes the objects of the present invention.

We claim:

1. In an electric drum brake, a brake drum, a backing plate, a pair of brake shoes supported by said backing plate, an actuating lever carried by said backing plate, said actuating lever having a tang thereon, an electromagnet having an aperture positioned around said tang, the improvement comprising:

a circumferential recess in said aperture, and means positioned at least partially within said circumferential recess to absorb vibrations and prevent contact between said tang and said electromagnet.

2. The electric drum brake of claim 1, wherein said means to absorb is made out of rubber.

3. The electric drum brake of claim 1, wherein said means to absorb is made out of cork.

4. Apparatus for mounting an electromagnet having an aperture therethrough to the tang of an actuating lever in an electric drum brake system comprising a circumferential recess in said aperture and a resilient vibration absorbing member positioned at least partially within said recess between the electromagnet and the tang.

5. Apparatus according to claim 4 wherein said resilient vibration absorbing member is an o-ring.

6. Apparatus according to claim 5 wherein said resilient vibration absorbing member is made of rubber.

7. Apparatus according to claim 5 wherein said resilient vibration absorbing member is made of cork.

* * * * *